United States Patent
Nemirow et al.

(10) Patent No.: US 7,095,185 B2
(45) Date of Patent: Aug. 22, 2006

(54) FLUORESCENT LAMP ELECTRONIC BALLAST

(75) Inventors: Arthur T. Nemirow, Carson City, NV (US); Charlie C. Park, Reno, NV (US)

(73) Assignee: Bruce Industries, Inc., Dayton, NV (US)

( * ) Notice: Subject to any disclaimer, the term of this patent is extended or adjusted under 35 U.S.C. 154(b) by 0 days.

(21) Appl. No.: 10/623,361

(22) Filed: Jul. 18, 2003

(65) Prior Publication Data

US 2005/0012467 A1     Jan. 20, 2005

(51) Int. Cl.
    *H05B 41/36*     (2006.01)
(52) U.S. Cl. .................... 315/291; 315/209 R; 315/307
(58) Field of Classification Search ............ 315/209 R, 315/224, 291, 307, 308, 247, DIG. 7
    See application file for complete search history.

(56) References Cited

U.S. PATENT DOCUMENTS

| | | | | |
|---|---|---|---|---|
| 5,220,250 A | * | 6/1993 | Szuba | 315/307 |
| 5,466,992 A |   | 11/1995 | Nemirow et al. | 35/276 |
| 5,621,279 A | * | 4/1997 | Nilssen | 315/247 |
| 5,907,223 A | * | 5/1999 | Gu et al. | 315/247 |
| 6,034,489 A | * | 3/2000 | Weng | 315/307 |
| 6,486,615 B1 | * | 11/2002 | Hui et al. | 315/291 |
| 6,703,796 B1 | * | 3/2004 | Che-Chen et al. | 315/291 |
| 6,788,557 B1 | * | 9/2004 | Phadke | 363/21.16 |

OTHER PUBLICATIONS

AN1059 "Design Equations of High-Power-Factor Flyback Converters Based on the L6561" by Claudio Adragna, ST Electronics, Mar. 2000.
AN1060 "Flyback Converters With the L6561 PFC Controller" by C. Adragna & G. Gattavari, ST Electronics, Jan. 2000.
AN1089 "Control Loop Modeling of L6561-Based TM PFC" by Claudio Adragna, ST Microelectronics, Mar. 2000.

* cited by examiner

*Primary Examiner*—Tuyet Vo
*Assistant Examiner*—Jimmy Vu
(74) *Attorney, Agent, or Firm*—Brooks Kushman P.C.

(57) ABSTRACT

A fluorescent lamp electronic ballast includes a power factor correction flyback circuit and an inverter ballast circuit. The power factor correction flyback circuit is composed of a rectifier connected to a DC to DC flyback converter. The flyback converter includes a flyback transformer connected to a diode/capacitor combination. The flyback transformer is switched during operation to produce a flyback waveform that is rectified by the diode and results in a DC output at the capacitor. The inverter ballast circuit receives the DC output and converts the DC output to an AC signal for operating the flourescent lamp.

11 Claims, 2 Drawing Sheets

FLUORESCENT LAMP ELECTRONIC BALLAST

BACKGROUND OF THE INVENTION

1. Field of the Invention

The present invention relates to fluorescent lamp electronic ballasts and to power factor correction for fluorescent lamp electronic ballasts.

2. Background Art

Fluorescent lamps with electronic ballasts are used in the aircraft industry because of the efficiency of fluorescent lighting technology. Conventional aircraft generators produce an AC voltage of nearly constant frequency. The conventional fluorescent lamp electronic ballast accommodates the nearly constant frequency AC voltage and drives one or more lamps with reasonable performance.

Recently, aircraft manufacturers have begun to employ wild frequency generators. Wild frequency AC generators are not able to control the output frequency of the generated waveform. The output frequency of the generator varies with the engine speed of the aircraft, typically producing a waveform with frequencies between 300 Hz and 800 Hz. Due to the reduction in generator complexity, wild frequency generators are more reliable, lighter, and result in lower maintenance costs when compared to conventional aircraft generators. However, conventional fluorescent lamp electronic ballasts are not able to accommodate the varying-frequency input.

Conventional ballasts that use a hold-up capacitor or passive power factor correction (PFC) L-C filters on the input are not able to operate with a varying frequency. At higher frequencies, these conventional ballasts draw excessive current, exhibit poor power factor, and exhibit poor total harmonic distortion (THD). PFC boost converters have been used in ballasts, but the boost converter topology creates inrush current at turn on. An existing inverter ballast circuit is shown in U.S. Pat. No. 5,466,992.

A recent development used in certain specific 50/60 Hz applications is the PFC flyback topology, which is intended to operate over a frequency range of 45 Hz to 66 Hz. The topology is centered on the L6561 integrated circuit from ST Microelectronics. Some background information may be found in ST Microelectronics application notes AN1059 "Design Equations Of High-Power-Factor Flyback Converters Based On The L6561," AN1060 "Flyback Converters With The L6561 PFC Controller," and AN1089 "Control Loop Modeling Of L6561-Based TM PFC." However, these recent developments have only been discussed for certain specific 50/60 Hz applications and fail to discuss problems that arise with a wild frequency generator power source.

For the foregoing reasons, there is a need for an improved flourescent lamp electronic ballast.

SUMMARY OF THE INVENTION

It is, therefore, an object of the present invention to provide an improved fluorescent lamp electronic ballast that includes a power factor correction flyback circuit and an inverter ballast circuit.

In carrying out the above object, a fluorescent lamp electronic ballast is provided. The ballast comprises a power factor correction flyback circuit and an inverter ballast circuit. The power factor correction flyback circuit is composed of a rectifier connected to a DC to DC flyback converter. The flyback converter includes a flyback transformer connected to a diode/capacitor combination. The flyback converter includes a switch used to switch the flyback transformer during operation to produce a flyback waveform that is rectified by the diode and results in a DC output at the capacitor. The inverter ballast circuit receives the DC output and inverts the DC output to an AC signal for operating the fluorescent lamp. The flyback converter may provide input to output isolation. The input voltage may be stepped up or stepped down.

At a more detailed level, the present invention comprehends a PFC flyback topology capable of operation over a wide range of frequencies and having low in-rush current at turn on. The preferred PFC flyback circuit implementation has several aspects that make wide frequency range operation and low in-rush current at turn on possible. In the most preferred implementation, the PFC flyback circuit provides high power factor and low total harmonic distortion (THD) over a wide range of frequencies ranging from 60 Hz to 800 Hz. One aspect that serves to broaden the range of accommodated AC input frequencies received at the rectifier is that the rectifier has a sufficiently low input capacitance (preferably less than 0.5 microfarads) such that the rectifier output substantially takes the form of a rectified AC wave.

In preferred implementations, the flyback converter is configured to operate in a transition mode. That is, the switching frequency of the flyback transformer varies in response to the instantaneous line voltage and output current. Operating in transition mode is advantageous in that it results in reduced EMI when compared to a PFC circuit that has a fixed switching frequency. More preferably, the flyback converter includes a control loop configured to monitor the flyback transformer and switch the flyback transformer asynchronously as needed to maintain energy balance. That is, at high voltage input or low current output the energy drawn each cycle may exceed the short-term demand from the load and the control loop delays the turning on of the switch so as to maintain the long-term energy balance by switching asynchronously. Preferably, the control loop is connected to the DC output of the flyback circuit. Alternatively, a suitable arrangement could utilize an auxiliary winding to monitor the flyback transformer and switch asynchronously as needed to maintain energy balance.

Aspects that allow the flyback circuit to operate over a wide range of AC input frequencies including those exceeding 300 Hz and preferably those between 300 Hz and 800 Hz include the modification of design parameters as needed to accommodate the higher frequencies. In particular, higher frequencies are accommodated by reducing the value of the rectifier input capacitance, reducing a capacitance across an error amplifier for the control loop that monitors the flyback transformer to initiate asynchronous switching, and maintaining a ratio of a line input peak voltage to the reflected voltage of less than one by increasing the primary to secondary flyback transformer turns ratio. Further, it is preferred that a temperature compensating type capacitor be used for the error amplifier capacitor.

The PFC flyback circuit in the most preferred implementation converts wild frequency AC voltage to 28 VDC. The inverter ballast circuit preferably inverts the DC output to an AC signal and may be that described in U.S. Pat. No. 5,466,922. The PFC flyback stage improves line regulation as well as immunity from line transients, and reduces in-rush current at turn on.

An additional aspect of the preferred PFC flyback circuit is the ability to produce multiple DC output supplies. In a preferred implementation, the inverter ballast includes a self-oscillating resonant circuit including a pair of power transistors. The flyback converter is further used to create a DC bias for use by the power transistors. This technique reduces dissipated power in the bias supply when compared to traditional biasing techniques. Further, a similar approach may be utilized to supply power to arc detect and dim control circuitry when provided. It is appreciated that the flyback converter has a number of advantages in a lamp electronic ballast including the ability to regulate over a very wide variation in input voltage. Thus, for low line or high line conditions, the ballast light output remains unchanged. In addition, the preferred flyback circuit provides short circuit protection from gross output short circuit conditions.

The advantages associated with embodiments of the present invention are numerous. For example, embodiments of the present invention allow 28 VDC aircraft equipment to be adapted for use with 115 VAC, 300–800 Hz (wild frequency) applications.

The above object and other objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
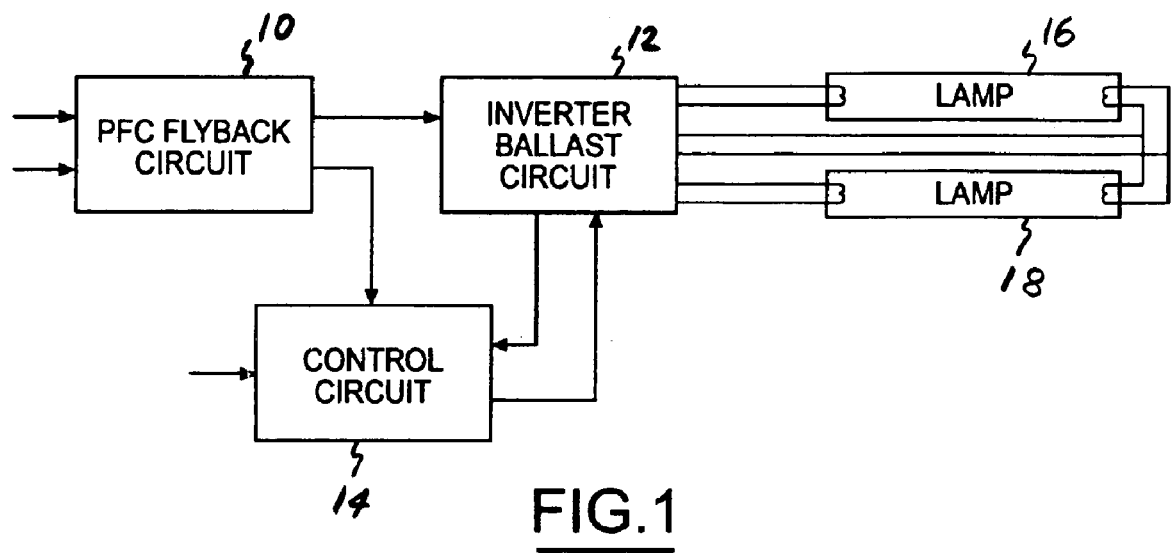
FIG. 1 is a diagram illustrating a fluorescent lamp electronic ballast in accordance with the preferred embodiment of the present invention.

FIG. 1 illustrates a fluorescent lamp electronic ballast including a power factor correction (PFC) flyback circuit 10, inverter ballast circuit 12, and control circuit 14. PFC flyback circuit 10 is composed of a rectifier receiving an AC input signal with the rectifier being connected to a DC to DC flyback converter. Inverter ballast circuit 12 receives the DC output from PFC flyback circuit 10 and converts the DC output to an AC signal for operating one or more fluorescent lamps 16, 18. Control circuit 14 includes arc detect and dim control circuitry.

Figure 2:
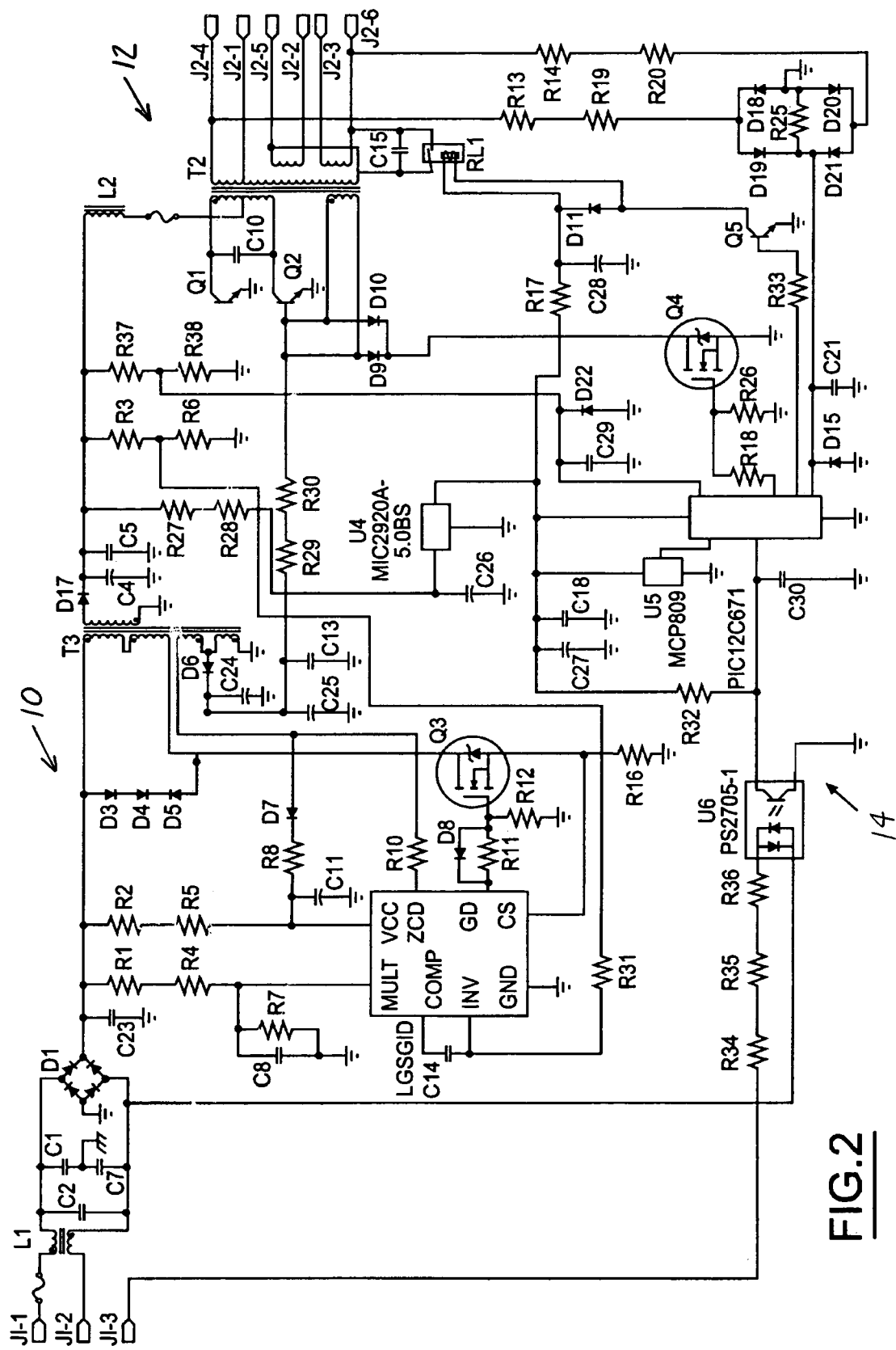
FIG. 2 is a circuit diagram illustrating the ballast of FIG. 1 in greater detail.

FIG. 2 illustrates the ballast components in greater detail. Referring to PFC flyback circuit 10, inputs J1-1 and J1-2 receive an AC voltage such as that generated by a wild frequency AC generator. EMI filtering is performed by inductors L1 and capacitors C1, C2, C7. Diode bridge D1 rectifies the input signal. One aspect that serves to broaden the range of accommodated AC input frequencies received at the rectifier is that the rectifier has a sufficiently low input capacitance with capacitor C23 preferably being less than 0.5 microfarads such that the rectifier output substantially takes the form of a rectified AC wave. The flyback converter includes flyback transformer T3 connected to diode D17 and capacitor C4. Transistor Q3 functions as a switch to switch flyback transformer T3 during operation to produce a flyback waveform that is rectified by diode D17 and results in a DC output at capacitor C4. Switching of transistor Q3 is controlled by integrated circuit U1 which is an L6561D available from ST Microelectronics. The flyback converter is configured to operate in a transition mode. That is, the switching frequency of the flyback transformer varies in response to the instantaneous line voltage and output current.

Additional components shown in FIG. 2 include diodes D3, D4, D5 connected across the primary winding of flyback transformer T3, resistors R1, R4, R7 and capacitor C8 connecting the rectifier output to the MULT pin, and resistors R2, R5 connecting the rectifier output to the VCC pin. The GND pin is grounded. Additionally, diode D6, capacitors C24, C25, C13, and resistors R29, R30 create a DC bias supply from an auxiliary winding of transformer T3. Resistor R16 senses current through transistor Q3 to provide a current sense signal to the CS pin. The ZCD pin uses resistor R10 to detect a zero current condition while diode D7, resistor R8, and capacitor C11 connect to the VCC pin. Still further, the GD pin connects to the gate of transistor Q3 through resistor R11, diode D8 and resistor R12. The flyback converter DC output voltage is divided by resistors R3, R6 and connected through feedback resistor R31 to the INV pin of integrated circuit U1. The INV pin is the inverting input of an internal comparator while the COMP pin is the internal comparator output. Capacitor C14 is connected between the COMP pin and the INV pin. The control loop through resistor R31 monitors the flyback transformer to switch the flyback transformer asynchronously as needed to maintain energy balance.

In operation of PFC flyback circuit 10, diode bridge D1 rectifies the AC input signal to produce an output substantially taking the form of a rectified AC wave. Transistor Q3 switches transformer T3 to produce a flyback waveform that is rectified by diode D17 resulting in a DC output at capacitor C4. More specifically, Q3 is controlled with the GD pin. Generally, transistor Q3 is turned on resulting in current through the primary winding steadily increasing as energy is stored in the transformer core. This increasing primary winding current is detected at the CS pin and when the current reaches a threshold, transistor Q3 is turned off. Turning off transistor Q3 produces a flyback action causing the stored core energy to be discharged through diode D17 to charge capacitor C4. The flyback action is detected at the ZCD pin, and in response transistor Q3 is turned back on to once again begin magnetizing the transformer core. The flyback converter is generally operated in a transition mode with the switching frequency varied in response to the instantaneous line voltage and output current as realized in the signals at the CS and ZCD pins. The control loop including feedback resistor R31 monitors the flyback transformer and the integrated circuit U1 switches the flyback transformer asynchronously as needed to maintain energy balance. That is, at high voltage input or low current output the energy drawn each cycle may exceed the short-term demand from the load and the control loop delays the turning on of transistor Q3 so as to maintain the long-term energy balance by switching asynchronously. The twice mains frequency ripple at capacitor C23 is input to the MULT pin so that integrated circuit U1 may control switching appropriately. A wide range of frequencies is accommodated with low rectifier input capacitance (capacitor C23), low capacitance across the error amplifier for the control loop with a temperature compensating capacitor (capacitor C14), and a ratio of a line input peak voltage to the reflected voltage of less than one.

In operation of PFC flyback circuit 10, diode bridge D1 rectifies the AC input signal to produce an output substantially taking the form of a rectified AC wave. Transistor Q3 switches transformer T3 to produce a flyback waveform that is rectified by diode D17 resulting in a DC output at capacitor C4. More specifically, Q3 is controlled with the GD pin. Generally, transistor Q3 is turned on resulting in current through the primary winding steadily increasing as energy is stored in the transformer core. This increasing primary winding current is detected at the CS pin and when the current reaches a threshold, transistor Q3 is turned off.

Turning off transistor Q3 produces a flyback action causing the stored core energy to be discharged through diode D17 to charge capacitor C4. The flyback action is detected at the ZCD pin, and in response transistor Q3 is turned back on to once again begin charging the transformer core. The flyback converter is generally operated in a transition mode with the switching frequency varied in response to the instantaneous line voltage and output current as realized in the signals at the CS and ZCD pins. The control loop including feedback resistor R31 monitors the flyback transformer and the integrated circuit U1 switches the flyback transformer asynchronously as needed to maintain energy balance. That is, at high voltage input or low current output the energy drawn each cycle may exceed the short-term demand from the load and the control loop delays the turning on of transistor Q3 so as to maintain the long-term energy balance by switching asynchronously. The twice mains frequency ripple at capacitor C23 is input to the MULT pin so that integrated circuit U1 may control switching appropriately. A wide range of frequencies is accommodated with low rectifier input capacitance (capacitor C23), low capacitance across the error amplifier for the control loop with a temperature compensating capacitor (capacitor C14), and a ratio of a line input peak voltage to the reflected voltage of less than one.

Inverter ballast circuit 12 includes inductor L2 which is connected to transformer T2. Inverter ballast circuit 12 inverts the DC output to an AC signal, for example, as described in U.S. Pat. No. 5,466,922. In particular, inductor L2 feeds a center tap on the primary winding of transformer T2. One end of the primary winding is connected to transistor Q1 and the other end of the primary winding is connected to transistor Q2. Capacitor C10 connects the collectors of the transistors. A feedback winding is connected between the bases of the transistors to form a self-oscillating resonant circuit. The secondary side of transformer T2 includes outputs J2-1, J2-2, J2-3, J2-4, J2-5, J2-6 for connecting one or two flourescent lamps. In operation, transistors Q1 and Q2 are alternatively activated such that the input current to the inverter ballast alternates directions to produce an AC signal for the flourescent lamps.

Additional components shown in FIG. 2 include capacitor C5, resistors R27, R28 and capacitor C26 that provide an input signal to integrated circuit U4 which provides a power supply for control circuit 14. Control circuit 14 includes input J1-3 for receiving a dim control signal. Integrated circuit U6 is an opto-coupler and the dim control signal is received through input resistors R34, R35, R36. Integrated circuits U3 and U5 and the remainder of control circuit 14 are implemented to provide dimming control and arc detection.

The output of the opto-coupler is connected to integrated circuit U3 through capacitor C30, and to the supply voltage through resistor R32. Capacitors C18, C27 are also connected at the supply voltage. Resistors R37, R38 form a voltage divider that connects to integrated circuit U3 through diode D22 and capacitor C29 to provide a status of the flyback output. Integrated circuit U3 controls transistor Q4 based on various factors by providing an input through resistors R18, R26. Transistor Q4 is connected to the bases of the transistors Q1, Q2 through diodes D9, D10. Transistor Q4 may be turned on and off to control operation of the oscillator circuit.

Additional components shown in control circuit 14 relate to arc detection and include a diode bridge composed of diodes D18, D19, D20, D21 and sensing resistor R25 connected to integrator circuit U3 through capacitor C21 and diode D15. The diode bridge is connected to the lamp driving outputs on one side by resistors R13, R19 and on the other side by resistors R14, R20. A relay circuit determines where the voltage is measured and includes relay RL1 and capacitor C15. Relay RL1 may be activated by integrated circuit U3 by driving transistor Q5 through resistor R33. The remaining components of the relay circuit include resistor R17, capacitor C28 and diode D11.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluorescent lamp electronic ballast comprising:
   a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and
   an inverter ballast circuit receiving the DC output and inverting the DC output to an AC signal for operating the fluorescent lamp.

2. The fluorescent lamp electronic ballast of claim 1 wherein the rectifier receives an AC input having a varying frequency and the rectifier has a sufficiently low input capacitance such that the rectifier output substantially takes the form of a rectified AC wave.

3. The fluorescent lamp electronic ballast of claim 1 wherein the flyback converter is configured to operate in a transition mode.

4. The fluorescent lamp electronic ballast of claim 3 wherein the flyback converter includes a control loop configured to monitor the flyback transformer and switch the flyback transformer asynchronously as needed to maintain energy balance.

5. The fluorescent lamp electronic ballast of claim 4 wherein the control loop is connected to the DC output.

6. A fluorescent lamp electronic ballast comprising:
   a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and
   an inverter ballast circuit receiving the DC output and inverting the DC output to an AC signal for operating the fluorescent lamp;
   wherein the rectifier receives an AC input having a frequency that varies to frequencies exceeding 300 Hz.

7. A fluorescent lamp electronic ballast comprising:
   power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and an inverter ballast circuit receiving the DC output and inverting the DC output to an AC signal for operating the fluorescent lamp;

wherein the rectifier receives an AC input having a frequency that varies primarily between 300 Hz and 800 Hz.

8. A fluorescent lamp electronic ballast comprising:

a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and an inverter ballast circuit receiving the DC output and inverting the DC output to an AC signal for operating the fluorescent lamp;

wherein the inverter ballast includes a self-oscillating resonant circuit including a pair of power transistors, and the flyback converter is further used to create a DC bias for use by the power transistors.

9. A fluorescent lamp electronic ballast comprising:

a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and an inverter ballast circuit receiving the DC output and inverting the DC output to an AC signal for operating the fluorescent lamp;

wherein the DC output is 28 VDC.

10. A fluorescent lamp electronic ballast comprising:

a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and an inverter ballast circuit receiving the DC output and inverting the DC output to an AC signal for operating the fluorescent lamp;

wherein the rectifier has an input capacitance of less than 0.5 microfarads.

11. A fluorescent lamp electronic ballast comprising:

a power factor correction flyback circuit composed of a rectifier connected to a DC to DC flyback converter, the flyback converter including a flyback transformer connected to a diode/capacitor combination, the flyback converter including a switch used to switch the flyback transformer during operation to produce a flyback waveform that is rectified by the diode and results in a DC output at the capacitor; and an inverter ballast circuit receiving the DC output and inverting the DC output to an AC signal for operating the fluorescent lamp;

wherein a ratio of a line input peak voltage to the reflected voltage is less than one.

* * * * *